US008487579B2

(12) United States Patent
Grossmann et al.

(10) Patent No.: US 8,487,579 B2
(45) Date of Patent: Jul. 16, 2013

(54) DETERMINATION OF THE POSITION OF A COMPONENT

(75) Inventors: Alex Grossmann, Leonberg (DE); Mattias Hallor, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 1115 days.

(21) Appl. No.: 12/286,348

(22) Filed: Sep. 29, 2008

(65) Prior Publication Data

US 2009/0096404 A1 Apr. 16, 2009

(30) Foreign Application Priority Data

Oct. 11, 2007 (DE) ......................... 10 2007 048 886

(51) Int. Cl.
*H02P 6/00* (2006.01)

(52) U.S. Cl.
USPC ...... 318/721; 318/400.14; 318/799; 318/437; 123/376; 123/683; 123/684; 701/54; 701/85; 137/855; 180/335

(58) Field of Classification Search
USPC ............... 318/560, 400.32, 400.34, 280, 265, 318/466, 799, 400.01, 721, 400.14, 400.4, 318/432, 437, 489, 543, 568.16; 123/376, 123/398, 403, 683, 684, 442, 462; 188/282.5; 180/335; 224/236; 137/855; 206/92, 181; 701/54, 85, 101, 121
See application file for complete search history.

(56) References Cited

U.S. PATENT DOCUMENTS

| | | | | | |
|---|---|---|---|---|---|
| 4,380,985 | A * | 4/1983 | Otsuka et al. | ................. | 123/690 |
| 5,003,948 | A * | 4/1991 | Churchill et al. | ............. | 123/352 |
| 5,493,200 | A * | 2/1996 | Rozman et al. | ................. | 322/10 |
| 5,654,888 | A * | 8/1997 | Muller et al. | ................... | 701/54 |
| 6,528,966 | B2 * | 3/2003 | Na | ................................ | 318/727 |
| 6,838,855 | B2 * | 1/2005 | Kobayashi et al. | ........... | 318/800 |
| 6,844,693 | B2 * | 1/2005 | Tazawa et al. | ................ | 318/561 |
| 7,187,152 | B1 * | 3/2007 | Tsai | ......................... | 318/400.02 |
| 7,294,988 | B2 * | 11/2007 | Ajima et al. | .................. | 318/712 |
| 7,714,571 | B2 * | 5/2010 | Pirozzi et al. | ............ | 324/207.25 |

OTHER PUBLICATIONS

Stephen J. Chapman, Electric Machinery Fundamentals,1991, McGraw-Hill,Inc., Second Edition, pp. 2-3.*

* cited by examiner

*Primary Examiner* — Antony M Paul
(74) *Attorney, Agent, or Firm* — Kenyon & Kenyon LLP

(57) ABSTRACT

A method for determining the position of a component, that is able to be moved into at least two end positions with the aid of a drive, especially of a flap for controlling fluid flows in an internal combustion engine, includes the following steps: providing an electric signal that indicates the speed of motion of an element of the drive, determining a change in position of the component by the integration of the electric signal, and determining the absolute position of the component from the change in position.

9 Claims, 1 Drawing Sheet

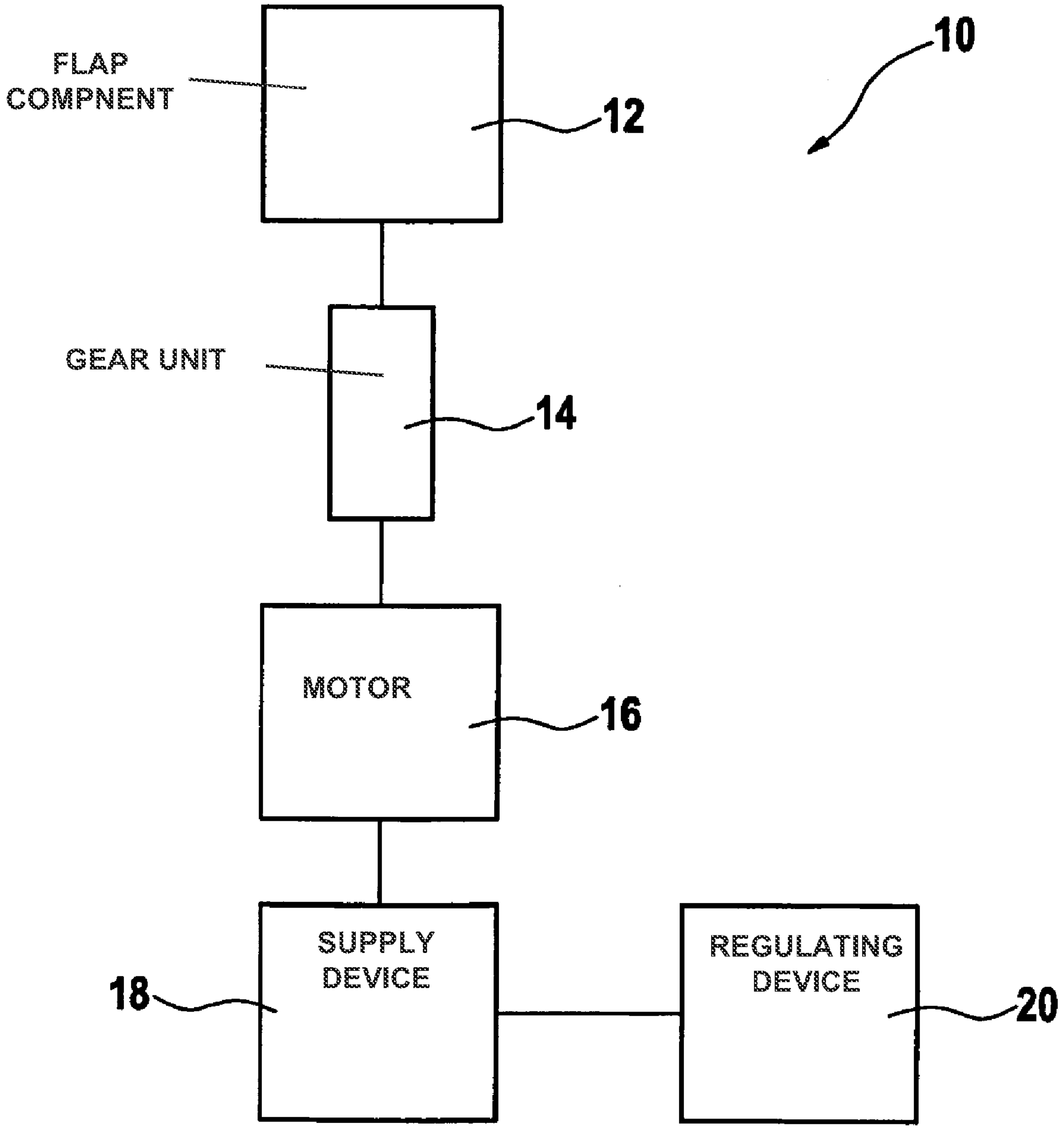
FLAP
COMPNENT
12
10
GEAR UNIT
14
MOTOR
16
SUPPLY
DEVICE
18
REGULATING
DEVICE
20

DETERMINATION OF THE POSITION OF A COMPONENT

BACKGROUND OF THE INVENTION

1. Field of the Invention

The present invention relates to a method and a device for determining the absolute position of a component, especially the absolute position of a flap for controlling fluid flows in an internal combustion engine.

2. Description of Related Art

Various flaps are provided in an internal combustion engine for controlling fluid flows. A charge movement flap may, for instance, be situated in the intake tract, shortly before the intake valve, in order to increase the turbulence of the flow in the combustion chamber, and thus to improve the thorough mixing of the air/fuel mixture. An intake-manifold switchover flap may also be provided, by which the effective length of an intake manifold is able to be changed. These flaps are usually driven by an electric motor and a gear unit, and are mostly just moved back and forth from end position to end position.

Up to now, the position of such flaps has been either controlled or regulated. In the control of the flaps, on the one hand, an external sensor may be provided for diagnosis. If no external sensor is provided, no diagnosis can be performed. Alternatively, the functioning of the flap may be diagnosed via external sensors and regulated.

In one usual control of such a flap, in the case of a construction in which no external sensor is provided, the flap may be moved to its end position at a predetermined tilting speed, for example. The flap then strikes against the limiting stop at the tilting speed, whereby the flap itself, or particularly a gear unit with which the flap is coupled to a drive, is greatly stressed. This leads to increased wear or damage to the flap or to its drive. Alternatively, the tilting speed may be kept so low over the entire adjusting path of the flap that no forceful impact is able to take place at the limiting stop. However, the adjusting time of the flap becomes considerably longer, because of this. To be sure, this problem may be solved by control or regulation of the flap using external position sensors, but if that is so, additional components have to be provided, installed and maintained.

BRIEF SUMMARY OF THE INVENTION

It is an object of the present invention to provide a position determination for a component, especially so as to implement a reliable position determination in the case of a flap for controlling fluid flows in an internal combustion engine. The position determination, in this context, should make do without sensors and be implemented in such a way that, in spite of short adjusting times, damage and premature wear are reliably prevented.

The present invention provides a method for determining the position of a component that is movable into at least two end positions with the aid of a drive, particularly a flap for controlling fluid flows in an internal combustion engine, including the steps:

- providing an electric signal that indicates the speed of motion of an element of the drive,
- determining a change in position of the component by the integration of the electric signal, and
- determining the absolute position of the component from the change in position.

The drive may, in this case, include an electric motor, for instance, which drives the component, such as a charge movement flap or an intake-manifold switchover flap, directly or via a gear unit. The speed of motion of an element of the drive may be ascertained, in this context, without external sensors, for example, by measuring the induced voltage in the case of a DC motor, for instance, in response to brief interruption of the control, so that even the speed of motion of the component may be determined without external sensors from the speed of motion of the element of the drive.

Consequently, in the method according to the present invention, the determination of the position change and the absolute position of the component may be managed without external sensors, so that a position diagnosis is made possible. A position-dependent regulation of the motion of the component may be achieved hereby, so that both as short an adjustment time as possible of the component between its end positions, and a long service life of the component and of the associated drive, may be ensured by avoiding a hard impact at an end stop or rather at its end position.

The speed of motion of the drive may be regulated as a function of the difference between the absolute position of the component and a setpoint position of the component. By such a regulation it may particularly simply be achieved that, for an adjustment time of the component that is as short as possible, for a large part of its adjustment path, a high speed of motion is selected, whereas in the vicinity of the end positions, the speed of motion of the drive, and thus also the speed of the component is reduced, to prevent a hard impact of the component on its respective end stop.

In the method according to the present invention, the direction of motion of the drive may be regulated as a function of the difference between the absolute position of the component and a setpoint position of the component. By doing this, time-consuming adjustment motions of the component in the "wrong" direction may be avoided, as would otherwise occur automatically in response to a control without external sensors, since, based on the position diagnosis according to the present invention, it may be determined, at any time, in which direction the absolute position of the component is deviating from its setpoint position.

In one specific example embodiment of the present invention, the drive may include a rotary motor, the speed of motion corresponding to the rotational speed of the motor, and the regulation of the rotational speed of the drive may take place as a function of the difference between the absolute position of the component and a setpoint position in such a way that the speed of the drive is reduced when the difference falls below a predetermined value. Consequently, it may be ensured in this specific embodiment that the component is braked before reaching an end stop, and the service life of the component, the motor and perhaps a gear unit, if provided, may be increased.

Such a regulation of the speed of the motor may be carried out in a particularly simple manner, in the specific embodiment of the present invention, if the speed of the motor is regulated to a first predetermined speed value, if the difference between the absolute position of the component and a setpoint position is greater than the predetermined value, and is regulated to a second predetermined speed value if the difference is less than the predetermined speed value, the first predetermined speed value being greater than the second predetermined speed value.

It may further be provided in the method according to the present invention that an additional electric signal is made available, and that, in this case, the absolute position of the component is adjusted corresponding to the known end position. The additional electric signal may be made available when it is detected that the reinduced voltage, that is proportional to the speed of motion, amounts to zero or approximately zero, although the drive of the flap is being supplied with current. Thus it may be recorded, for instance, by measuring the terminal voltage, that the component is located at an end stop. In this case, the value of the absolute position may be further corrected, and the accuracy of the position diagnosis of the component may be improved.

Moreover, the present invention also provides a device for determining an absolute position of a component, especially of a flap for controlling fluid flows in an internal combustion engine, including:

a component that is movable into at least two end positions, particularly a flap, a drive to move the component, and a position-determining device for receiving an electric signal that gives the speed of motion of an element of the drive, for determining a position change of the component by integration of the electric signal and for determining the absolute position of the component from the change of the position.

Using the device according to the present invention, a position diagnosis may thus be carried out from the speed of motion of an element of the drive that is determinable without external sensors. Such a position diagnosis of the component may then be used for regulating the motion of the component, so that it may be reliably prevented that the component impacts an end stop, for example, at high speed. As a result, the service life of the component and the drive may be prolonged, without requiring external sensors for the position diagnosis of the component.

In one specific example embodiment of the present invention, the drive may include a rotary motor, the speed of motion being the rotational speed of the motor; and furthermore, a regulating device being provided in order to regulate the speed of the drive as a function of the difference between the absolute position of the component and a setpoint position in such a way that the speed of the drive is reduced when the difference falls below a predetermined value. Consequently, it may be ensured particularly simply in this specific embodiment that the component is braked before reaching an end stop, and thus the service life of the component, the motor and perhaps a gear unit, if provided, may be increased.

Furthermore, in the device according to the present invention the position-determining device may be developed in such a way that an additional electric signal is provided if it is determined that the component is located at one of its end positions. Moreover, when the component reaches the end position, the absolute position of the component may be established corresponding to the end position. Consequently, if, for instance, by measuring the motor voltage in an electric motor that has a control current applied to, it is recognized that the component is located at its end stop, the value for the absolute position may be corrected and the accuracy of the position diagnosis of the component may be improved.

BRIEF DESCRIPTION OF THE DRAWING

FIG. 1 schematically shows the construction of a device for controlling fluid flows in an internal combustion engine, according to a specific embodiment of the present invention.

DETAILED DESCRIPTION OF THE INVENTION

As may be seen in FIG. 1, a FIG. 10, for controlling fluid flows in an internal combustion engine according to a specific embodiment of the present invention, includes a component 12, which is coupled to a motor 16, such as a rotary DC motor, via a gear unit 14. The motor is driven with the aid of a current supply device 18 which, in turn, is connected to a position determining and regulating device 20.

Component 12 is a flap, for example, particularly a charge movement flap or an intake-manifold switchover flap which is movable back and forth between two end positions, or rather end stops. Such components 12 and their associated drives 14, 16 are known in principle for controlling fluid flows in an internal combustion engine, and are therefore not described here in greater detail.

During the operation of device 10, the rotational speed of motor 16 is first measured. This may be done by measuring an induced voltage when motor 16 has no energy supplied to it. The voltage signal obtained is a function of the speed, and is supplied to position-determining and regulating device 20. There it is scanned at regular intervals and summed up, that is, integrated over time. From the integrated speed signal, position-determining and regulating device 20 determines a change in position of component 12, by recalculating the motion path of the rotor of motor 16 into an adjusting path of component 12, with the aid of the transmission ratio of gear unit 14, which was stored ahead of time. It is unimportant in this case whether DC motor 16 and component 12 are coupled via gear unit 14 according to a linear or a nonlinear relationship.

From the change in position of component 12 thus determined, in a further step, position-determining and regulating device 20 then ascertains an absolute position of component 12, by adding the change in position to the last stored absolute position of component 12.

The absolute position of component 12 may be used for a position regulation of component 12, for instance, one may use the ascertained absolute position in a regulation method in which motor 16 is switched over from a high to a low speed if the difference between the absolute position of component 12 and its setpoint position falls below a predetermined value. Thereby short adjusting times may be implemented and high impact speeds of component 12 on the respective end stop may be avoided. Furthermore, wear or damage to component 12, gear unit 14 or motor 16 may be avoided.

If it is determined, either by measuring the terminal voltage at a motor that has a control current applied to it, or by evaluating the absolute position, that component 12 is located in one of its end positions, position-determining and regulating device 20 emits a hold signal. Moreover, when it is determined that component 12 is located at one of its end positions, the absolute position determined from the integrated speed signal of motor 16 may be determined to be a known position corresponding to the end position, in order to minimize the deviation between the absolute position, determined by position-determining and regulating device 20, and the actual position of the component.

Instead of a change in the speed of motor 16, it is also possible, in the above-described regulation of component 12, to change the transmission ratio of gear unit 14, if the difference between the absolute position of component 12 and its setpoint position falls below a predetermined value, so that the speed of motion of component 12 is reduced in response to the approach to its setpoint position.

What is claimed is:

1. A method for determining an absolute position of a component configured to be able to be moved into at least two end positions with the aid of a drive, comprising:

providing an electric signal indicating a speed of motion of an element of the drive;

determining a change in position of the component by integration of the electric signal; and determining the absolute position of the component based on the determined change in position;

wherein the component is a flap for controlling fluid flows in an internal combustion engine.

2. The method as recited in claim 1, wherein an additional electric signal is provided if it is determined that the component is located at one of the at least two end positions.

3. A method for setting a speed of motion of a drive configured to move a component, comprising:

providing an electric signal indicating a speed of motion of an element of the drive;

determining a change in position of the component by integration of the electric signal;

determining an absolute position of the component based on the determined change in position; and setting the speed of motion of the drive as a function of the absolute position of the component;

wherein the component is a flap for controlling fluid flows in an internal combustion engine.

4. The method as recited in claim 3, wherein the speed of motion of the element of the drive is regulated as a function of a difference between the absolute position of the component and a setpoint position of the component.

5. The method as recited in claim 3, wherein a direction of motion of the drive is regulated as a function of a difference between the absolute position of the component and a setpoint position of the component.

6. A method for setting a speed of motion of a drive configured to move a component, comprising:

providing an electric signal indicating a speed of motion of an element of the drive;

determining a change in position of the component by integration of the electric signal;

determining an absolute position of the component based on the determined change in position; and setting the speed of motion of the drive as a function of the absolute position of the component;

wherein the drive includes a motor, and the speed of the motion of the element of the drive corresponds to the rotational speed of the motor, and wherein a regulation of the rotational speed of the motor takes place as a function of a difference between the absolute position of the component and a setpoint position, in such a way that the rotational speed of the motor is reduced if the difference between the absolute position and the setpoint position falls below a predetermined value.

7. The method as recited in claim 6, wherein the rotational speed of the motor is regulated to a first predetermined rotational speed value if the difference between the absolute position of the component and the setpoint position is greater than the predetermined value, and wherein the rotational speed of the motor is regulated to a second predetermined rotational speed value if the difference is less than the predetermined value, the first predetermined rotational speed value being greater than the second predetermined rotational speed value.

8. A device for determining an absolute position of a component configured to be able to be moved into at least two end positions with the aid of a drive, comprising:

a position-determining unit configured to: a) receive an electric signal indicating a speed of motion of an element of the drive, and b) determine the absolute position of the component based on an integration of the electric signal;

wherein the drive includes a motor, and the speed of the motion of the element of the drive corresponds to the rotational speed of the motor, and wherein the device further includes a regulating device configured to regulate the rotational speed of the motor takes place as a function of a difference between the absolute position of the component and a setpoint position, in such a way that the rotational speed of the motor is reduced if the difference between the absolute position and the setpoint position falls below a predetermined value.

9. The device as recited in claim 8, wherein the position-determining unit is configured to provide an additional electric signal if it is determined that the component is located at one of the at least two end positions.

* * * * *